US007720830B2

(12) United States Patent
Wen et al.

(10) Patent No.: US 7,720,830 B2
(45) Date of Patent: May 18, 2010

(54) HIERARCHICAL CONDITIONAL RANDOM FIELDS FOR WEB EXTRACTION

(75) Inventors: Ji-Rong Wen, Beijing (CN); Wei-Ying Ma, Beijing (CN); Zaiqing Nie, Beijing (CN); Jun Zhu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 11/461,400

(22) Filed: Jul. 31, 2006

(65) Prior Publication Data

US 2008/0027969 A1    Jan. 31, 2008

(51) Int. Cl.
*G06F 7/00* (2006.01)
*G06F 17/30* (2006.01)
*G06F 17/00* (2006.01)
*G06F 15/173* (2006.01)

(52) U.S. Cl. ................. 707/705; 707/741; 709/226
(58) Field of Classification Search ................. 707/102
See application file for complete search history.

(56) References Cited

U.S. PATENT DOCUMENTS

| | | | | |
|---|---|---|---|---|
| 5,594,911 | A * | 1/1997 | Cruz et al. | 709/204 |
| 6,076,088 | A * | 6/2000 | Paik et al. | 707/5 |
| 6,148,349 | A * | 11/2000 | Chow et al. | 710/33 |
| 6,304,864 | B1 | 10/2001 | Liddy et al. | |
| 6,353,825 | B1 | 3/2002 | Ponte | |
| 6,418,434 | B1 | 7/2002 | Johnson et al. | |
| 6,418,448 | B1 | 7/2002 | Sarkar | |
| 6,493,706 | B1 * | 12/2002 | Mead et al. | 707/3 |
| 6,519,580 | B1 * | 2/2003 | Johnson et al. | 706/47 |
| 6,631,369 | B1 | 10/2003 | Meyerzon et al. | |
| 6,665,665 | B1 | 12/2003 | Ponte | |
| 6,965,903 | B1 * | 11/2005 | Agarwal et al. | 707/104.1 |

(Continued)

FOREIGN PATENT DOCUMENTS

WO    WO 00/57311    9/2000

(Continued)

OTHER PUBLICATIONS

James Orlin; Contentment in Graph Theory: Convering Graphs with Cliques; 1977.*

(Continued)

*Primary Examiner*—Neveen Abel Jalil
*Assistant Examiner*—Jermaine Mincey
(74) *Attorney, Agent, or Firm*—Perkins Coie LLP

(57) ABSTRACT

A method and system for labeling object information of an information page is provided. A labeling system identifies an object record of an information page based on the labeling of object elements within an object record and labels object elements based on the identification of an object record that contains the object elements. To identify the records and label the elements, the labeling system generates a hierarchical representation of blocks of an information page. The labeling system identifies records and elements within the records by propagating probability-related information of record labels and element labels through the hierarchy of the blocks. The labeling system generates a feature vector for each block to represent the block and calculates a probability of a label for a block being correct based on a score derived from the feature vectors associated with related blocks. The labeling system searches for the labeling of records and elements that has the highest probability of being correct.

13 Claims, 10 Drawing Sheets

U.S. PATENT DOCUMENTS

| | | | |
|---|---|---|---|
| 6,996,778 | B2 | 2/2006 | Rajarajan et al. |
| 7,058,913 | B1* | 6/2006 | Siegel et al. .................. 716/10 |
| 7,231,395 | B2 | 6/2007 | Fain et al. |
| 2004/0034652 | A1* | 2/2004 | Hofmann et al. ............ 707/102 |
| 2004/0080549 | A1* | 4/2004 | Lord et al. .................. 345/854 |
| 2004/0181749 | A1 | 9/2004 | Chellapilla et al. |
| 2005/0108200 | A1 | 5/2005 | Meik et al. |
| 2006/0031211 | A1 | 2/2006 | Mizuno |
| 2006/0074881 | A1 | 4/2006 | Vembu et al. |
| 2006/0080353 | A1* | 4/2006 | Miloushev et al. .......... 707/102 |
| 2006/0098871 | A1 | 5/2006 | Szummer |
| 2006/0101060 | A1* | 5/2006 | Li et al. ...................... 707/102 |
| 2006/0167928 | A1* | 7/2006 | Chakraborty et al. ....... 707/102 |
| 2006/0253437 | A1 | 11/2006 | Fain et al. |
| 2007/0150486 | A1 | 6/2007 | Wen et al. |
| 2008/0027910 | A1 | 1/2008 | Wen et al. |

FOREIGN PATENT DOCUMENTS

WO        WO 00/73942 A2     12/2000

OTHER PUBLICATIONS

Richard D. Alba; A Graph-Theoretic Definition of a Sociometric Clique; 1973; Gordon and Breach Science Publishers;vol. 3.*
P. Erdos; Graph Theory and Probability; 1960.*
Claude Berge; Two Theormes in Graph Theory; 1957.*
Pinto, David et al., "Table Extraction Using Conditional Random Fields," SIGIR'03, Jul. 28-Aug. 1, © 2003 ACM.
Zhu, Jun et al., "Simultaneous Record Detection and Attribute Labeling in Web Data Extraction," KDD'06, Aug. 20-23, 2006, Philadelphia, Pennsylvania, copyright 2006 ACM.
Bondy, J.A. and U.S.R. Murty, "7.2 Ramsey's Theorem—definition of clique, and 1.2 Graph Isomorphism—definition of complete graph," pp. 103 and 4, Graph Theory with Applications, © J. A. Bondy and U. S. R. Murty 1976, American Elsevier Publishing Co., Inc.
Freitag, Dayne and Andrew Kachites McCallum, "Information Extraction with HMMs and Shrinkage," In Proceedings of the AAAI-99 Workshop on Machine Learning for Information Extraction, 1999, 6 pages.
Marchiori, Massimo, "The limits of Web metadata, and beyond," Proceedings of the Seventh International World Wide Web Conference, Brisbane, Australia, 1998, 9 pages.
Ratnaparkhi, Adwait, "A Maximum Entropy Model for Part-Of-Speech Tagging," Proceedings of EMNLP, 1996, pp. 133-142.
Westerveld, Thijs et al., "Retrieving Web Pages Using Content, Links, URLs and Anchors," 2001, University of Twente, The Netherlands, 10 pages.
Arasu, Arvind and Hector Garcia-Molina, "Extracting Structured Data from Web Pages," SIGMOD 2003, San Diego, © 2003 ACM, 12 pages.
Arlotta, Luigi et al., "Automatic Annotation of Data Extracted from Large Web Sites," International Workshop on the Web and Databases, Jun. 2003, San Diego, 6 pages.
Balmin, Andrey, Vagelis Hristidis and Yannis Papakonstantinou, "ObjectRank: Authority-Based Keyword Search in Databases," Proceedings of the 30th VLDB Conference, Toronto, Canada, 2004, 12 pages.
Berger, Adam L., Stephen A. Della Pietra and Vincent J. Della Pietra, "A Maximum Entropy Approach to Natural Language Processing," Computational Linguistics, vol. 22, No. 1, © 1996 Association for Computational Linguistics, 36 pages.
Besag, Julian, "Spatial Interaction and the Statistical Analysis of Lattice Systems," Journal of the Royal Statistical Society, Series B, vol. 36, No. 2, 1974, pp. 192-236.
Bunescu, Razvan C. and Raymond J. Mooney, "Relational Markov Networks for Collective Information Extraction," Proceedings of the ICML 2004 Workshop on Statistical Relational Learning and its Connections to Other Fields (SLR-2004), Banff, Canada, Jul. 2004, 7 pages.
Buttler, David, Ling Liu and Calton Pu, "A Fully Automated Object Extraction System for the World Wide Web," Proceedings of IEEE ICDCS-21, 2001, 11 pages.
Cai, Deng et al., "VIPS: a Vision-based Page Segmentation Algorithm," Nov. 1, 2003, Microsoft Technical Report MSR-TR-2003-79, pp. 1-29.
Cai, Deng, Shipeng Yu, Ji-Rong Wen and Wei-Ying Ma, "Block-based Web Search," SIGIR'04, Sheffield, South Yorkshire, UK, © 2004 ACM, 8 pages.
Chang, Chia-Hui and Shao-Chen Lui, "IEPAD: Information Extraction Based on Pattern Discovery," WWW10, May, Hong Kong, © 2001 ACM, pp. 681-688.
Clarke, Charles L. A., "Controlling Overlap in Content-Oriented XML Retrieval," SIGIR'05, Salvador, Brazil, © 2005 ACM, 8 pages.
Collins, Michael, "Discriminative Training Methods for Hidden Markov Models: Theory and Experiments with Perceptron Algorithms," 2002, 8 pages.
Collins, Michael, "Ranking Algorithms for Named-Entity Extraction: Boosting and the Voted Perceptron," Proceedings of the 40th Annual Meeting of the Association for Computational Linguistics, Philadelphia, Jul. 2002, pp. 489-496.
Crescenzi, Valter, Giansalvatore Mecca and Paolo Merialdo, "RoadRunner: Towards Automatic Data Extraction from Large Web Sites," Proceedings of the 27th VLDB Conference, Italy, 2001, 10 pages.
Embley, D.W., Y.S. Jian and Y.-K. Ng, "Record-Boundary Discovery in Web Documents," in Proceedings of SIGMOD'99, 1999, pp. 1-24.
Fagin, Ronald et al., "Searching the Workplace Web," WWW 2003, Budapest, Hungary, ACM, 10 pages.
Fine, Shai, Yoram Singer and Naftali Tishby, "The Hierarchical Hidden Markov Model: Analysis and Applications," Machine Learning, vol. 32, 1998, © 1998 Kluwer Academic Publishers, pp. 41-62.
Gravano, Luis and Hector Garcia-Molina, "Generalizing GLOSS to Vector-Space Databases and Broker Hierachies," Proceedings of the 21st VLDB Conference, Zurich, Switzerland, 1995, 12 pages.
He, Xuming et al., "Multiscale Conditional Random Fields for Image Labeling," Proceedings of the 2004 IEEE Computer Society Conference on Computer Vision and Pattern Recognition, pp. 1-8.
Jensen, F. V., S. L. Lauritzen and K. G. Olesen, "Bayesian Updating in Causal Probabilistic Networks by Local Computations," Computational Statistics Quarterly 4, 1990, ©0 Physica-Verlag, pp. 269-282.
Kamps, Jaap et al., "Length Normalization in XML Retrieval," SIGIR'04, Sheffield, South Yorkshire, UK, © 2004 ACM, 8 pages.
Kobayashi, Mei and Koichi Takeda, "Information Retrieval on the Web," ACM Computing Surveys, vol. 32, No. 2, Jun. 2000, pp. 144-173.
Kschischang, Frank R., Brendan J. Frey and Hans-Andrea Loeliger, "Factor Graphs and the Sum-Product Algorithm," IEEE Transactions on Information Theory, vol. 47, No. 2, Feb. 2001, © 2001 IEEE, pp. 498-519.
Kumar, Sanjiv and Martial Hebert, "Discriminative Fields for Modeling Spatial Dependencies in Natural Images," Advances in Neural Information Processing Systems, NIPS 16, 2004, 8 pages.
Kumar, Sanjiv and Martial Hebert, "Discriminative Random Fields: A Discriminative Framework for Contextual Interaction in Classification," Proceedings of the 2003 IEEE International Conference on Computer Vision, vol. 2, 2003, 8 pages.
Kushmerick, Nicholas, "Wrapper induction: Efficiency and expressiveness," Mar. 10, 1999, Artificial Intelligence 118, 2000, © 2000 Elsevier Science B.V., pp. 15-68.
Laender, Alberto et al., "A Brief Survey of Web Data Extraction Tools," ACM SIGMOD Record, 31 (2), 2002, 10 pages.
Lafferty, John, Andrew McCallum and Fernando Pereira, "Conditional Random Fields: Probabilistic Models for Segmenting and Labeling Sequence Data," in Proceedings of ICML 2001, 8 pages.
Lalmas, Mounia, "Dempster-Shafer's Theory of Evidence applied to Structured Documents: modelling Uncertainty," SIGIR 1997, Philadelphia, Pennsylvania, © 1997 ACM, pp. 110-118.
Leek, Timothy Robert, "Information Extraction Using Hidden Markov Models," University of California, San Diego Computer Science Thesis Paper, 1997, 44 pages.

Lerman, Kristina et al., "Using the Structure of Web Sites for Automatic Segmentation of Tables," SIGMOD 2004, Paris, © 2004 ACM, 12 pages.

Lerman, Kristina, Steven N. Minton and Craig A. Knoblock, "Wrapper Maintenance: A Machine Learning Approach," Journal of Artificial Intelligence Research 18, 2003, © 2003 AI Access Foundation and Morgan Kaufmann Publishers, pp. 149-181.

Li, Jia, Amir Najmi and Robert M. Gray, "Image Classification by a Two-Dimensional Hidden Markov Model," Jul. 4, 1999, IEEE Transactions on Signal Processing, vol. 48, No. 2, Feb. 2000, © 2000 IEEE, pp. 517-533.

Libra. An Object-level Academic Search Engine. http://libra.direct-taps.net [last accessed Nov. 13, 2006].

Liu, Bing and Yanhong Zhai, "NET—A System for Extracting Web Data from Flat and Nested Data Records," Proceedings of 6th International Conference on Web Information Systems Engineering (WISE-05), 2005, 8 pages.

Liu, Bing, Robert Grossman & Yanhong Zhai, "Mining Data Records in Web Pages," SIGKDD'03, Washington, DC, © 2003 ACM, pp. 601-606.

Liu, Dong C. and Jorge Nocedal, "On the Limited Memory BFGS Method for Large Scale Optimization," Appeared in Mathematical Programming 45, 1989, pp. 503-528.

Malouf, Robert, "A comparison of algorithms for maximum entropy parameter estimation," In Proceedings of the 6th Conference on Natural Language Learning 2002, pp. 49-55.

McCallum, Andrew, Dayne Freitag and Fernando Pereira, "Maximum Entropy Markov Models for Information Extraction and Segmentation," Proc. ICML 2000, pp. 591-598.

Muslea, Ion, Steven Minton and Craig A. Knoblock, "Hierarchical Wrapper Induction for Semistructured Information Sources," Sep. 10, 1999, © 1999 Kluwer Academic Publishers, pp. 1-28.

Nie, Zaiqing et al, "Object-Level Ranking: Bringing Order to Web Objects," WWW 2005, Chiba, Japan, 8 pages.

Ogilvie, Paul and Jamie Callan, "Combining Document Representations for Known-Item Search," SIGIR'03, Toronto, Canada, © 2003 ACM, pp. 143-150.

Peng, Fuchun and Andrew McCallum, "Accurate Information Extraction from Research Papers using Conditional Random Fields," 2004, Proceedings of Human Language.

Robertson, Stephen, Hugo Zaragoza and Michael Taylor, "Simple BM25 Extension to Multiple Weighted Fields," CIKM'04, Washington DC, © 2004 ACM, pp. 42-49.

Sha, Fei and Fernando Pereira, "Shallow Parsing with Conditional Random Fields," Proceedings of Human Language Technology, NAACL 2003, 8 pages.

Skounakis, Marios, Mark Craven and Soumya Ray, "Hierarchical Hidden Markov Models for Information Extraction," Proceedings of the 18th International Joint Conference on Artificial Intelligence, Acapulco, Mexico, Morgan Kaufmann, 2003, 7 pages.

Song, Ruihua et al., "Learning Block Importance Models for Web Pages," WWW 2004, New York, pp. 203-211.

Sutton, Charles, Khashayar Rohanimanesh and Andrew McCallum, "Dynamic Conditional Random Fields: Factorized Probabilistic Models for Labeling and Segmenting Sequence Data," Proceedings of the 21st International Conference on Machine Learning, Banff, Canada, 2004, 8 pages.

Taskar, Ben, Pieter Abbeel and Daphne Koller, "Discriminative Probabilistic Models for Relational Data," In Proceedings of the 18th Conference on Uncertainty in Artificial Intelligence, 2002, 8 pages.

Tejeda, Sheila et al., "Learning Domain-Independent String Transformation Weights for High Accuracy Object Identification," SIGKDD'02, Edmonton, Alberta, Canada, © 2002 ACM, 10 pages.

Wang, Jiying and Frederick H. Lochovsky, "Data Extraction and Label Assignment for Web Databases," WWW 2003, Budapest, Hungary, ACM, pp. 187-196.

Wilkinson, Ross, "Effective Retrieval of Structured Documents," SIGIR 1994, pp. 311-317.

Xu, Jinxi and Jamie Callan, "Effective Retrieval with Distributed Collections," SIGIR'98, Melbourne, Australia, © 1998 ACM, 9 pages.

Yi, Lan, Bing Liu and Xiaoli Li, "Eliminating Noisy Information in Web Pages for Data Mining," SIGKDD'03, Washington D.C., © 2003 ACM, 10 pages.

Yu, Shipeng et al., "Improving Pseudo-Relevance Feedback in Web Information Retrieval Using Web Page Segmentation," WWW 2003, Hungary, ACM, 8 pages.

Yu, Stella X., Tai Sing Lee and Takeo Kanade, "A Hierarchical Markov Random Field Model for Figure-Ground Segregation," EMMCVPR 2001, © Springer-Verlag Berlin Heidelberg 2001, pp. 118-133.

Zhai, Yanhong and Bing Liu, "Web Data Extraction Based on Partial Tree Alignment," WWW 2005, Chiba, Japan, ACM, 10 pages.

Zhao, Hongkun et al., "Fully Automatic Wrapper Generation for Search Engines," WWW 2005, Chiba, Japan, ACM, 10 pages.

Zhu, Jun et al., "2D Conditional Random Fields for Web Information Extraction," Proceedings of the 22nd International Conference on Machine Learning, Germany, 2005, 8 pages.

\* cited by examiner

HIERARCHICAL CONDITIONAL RANDOM FIELDS FOR WEB EXTRACTION

BACKGROUND

Web pages accessible via the Internet contain a vast amount of information. A web page may contain information about various types of objects such as products, people, papers, organizations, and so on. For example, one web page may contain a product review of a certain model of camera, and another web page may contain an advertisement offering to sell that model of camera at a certain price. As another example, one web page may contain a journal article, and another web page may be the homepage of an author of the journal article. A person who is searching for information about an object may need information that is contained in different web pages. For example, a person who is interested in purchasing a certain camera may want to read reviews of the camera and to determine who is offering the camera at the lowest price.

To obtain such information, a person would typically use a search engine to find web pages that contain information about the camera. The person would enter a search query that may include the manufacturer and model number of the camera. The search engine then identifies web pages that match the search query and presents those web pages to the user in an order that is based on how relevant the content of the web page is to the search query. The person would then need to view the various web pages to find the desired information. For example, the person may first try to find web pages that contain reviews of the camera. After reading the reviews, the person may then try to locate a web page that contains an advertisement for the camera at the lowest price.

Web search systems have not been particularly helpful to users trying to find information about a specific product because of the difficulty in accurately identifying objects and their attributes from web pages. Web pages often allocate a record for each object that is to be displayed. For example, a web page that lists several cameras for sale may include a record for each camera. Each record contains attributes of the object such as an image of the camera, its make and model, and its price. Web pages contain a wide variety of layouts of records and layouts of attributes within records. Systems identifying records and their attributes from web pages are typically either template-dependent or template-independent. Template-dependent systems may have templates for both the layout of records on web pages and the layout of attributes within a record. Such a system finds record templates that match portions of a web page and then finds attribute templates that match the attributes of the record. Template-independent systems, in contrast, typically try to identify whether a web page is a list page (i.e., listing multiple records) or a detail page (i.e., a single record). The template-independent system then tries to identify records from metadata of the web page (e.g., tables) based on this distinction. Such systems may then use various heuristics to identify the attributes of the records.

A difficulty with these systems is that records are often incorrectly identified. An error in the identification of a record will propagate to the identification of attributes. As a result, the overall accuracy is limited by the accuracy of the identification of records. Another difficulty with these systems is that they typically do not take into consideration the semantics of the content of a portion that is identified as a record. A person, in contrast, can easily identify records by factoring in the semantics of their content.

SUMMARY

A method and system for labeling object information of an information page is provided. A labeling system identifies an object record of an information page based on the labeling of object elements within an object record and labels object elements based on the identification of an object record that contains the object elements. Thus, the labeling system jointly identifies records and label elements in a way that is more effective than if performed separately. To jointly identify the records and label the elements, the labeling system generates a hierarchical representation of blocks of an information page with blocks being represented as vertices of the hierarchical representation. The labeling system identifies records and elements within the records by propagating probability-related information of record labels and element labels through the hierarchy of the blocks. The labeling system generates a feature vector for each block to represent the block and calculates a probability of a label for a block being correct based on a score derived from the feature vectors associated with related blocks. The labeling system may use a propagation technique to propagate the effect of a labeling of one block to the other blocks within the hierarchical representation. The labeling system searches for the labeling of records and elements that has the highest probability of being correct.

A labeling system uses a hierarchical conditional random fields ("CRF") technique to label the object elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for labeling object information of an information page is provided. In one embodiment, a labeling system identifies an object record of an information page, such as a web page, based on the labeling of object elements within an object record and labels object elements based on the identification of an object record that contains the object elements. To identify the records and label the elements, the labeling system generates a hierarchical representation of blocks of a web page with blocks being represented as vertices of the hierarchical representation. A block may represent a collection of information of a web page that is visually related. a root block represents the entire web page, a leaf block is an atomic unit (such as an element of a record), and inner blocks represent collections of their child blocks. The labeling system identifies records and elements within the records by propagating probability-related information of record labels and element labels through the hierarchy of the blocks. The labeling system generates a feature vector for each block to represent the block. The labeling system calculates a probability of a label for a block being correct based on a score derived from the feature vectors associated with related blocks. A related block may be a block that is either a parent block or a nearest sibling block within the hierarchical representation. A collection of related blocks is referred to as a "clique." The labeling system may define feature functions that generate scores, which are combined to give an overall score for a label for a block. A feature function may evaluate the features of a block itself, the combined features of a block and a related block, and the combined features of a block and all its related blocks. The labeling system may use a propagation technique to propagate the effect of a labeling of one block to the other blocks within the hierarchical representation. The labeling system searches for the labeling of records and elements that has the highest probability of being correct.

Figure 1:
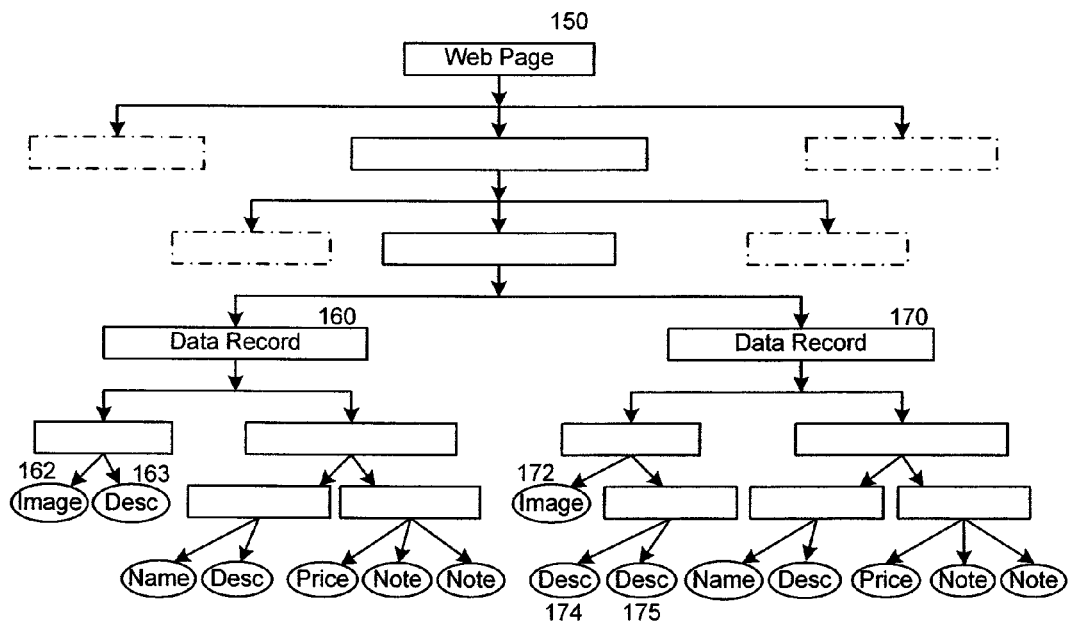
FIG. 1 is a diagram that illustrates an example web page and its corresponding vision tree.
Figure 1:
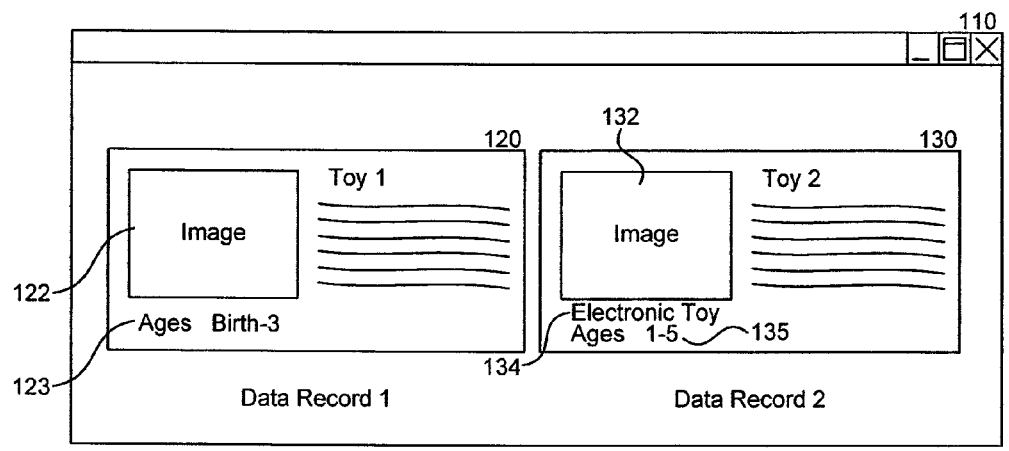

In one embodiment, the labeling system uses a vision-based page segmentation ("VIPS") technique to generate a hierarchical representation of blocks of a web page. One VIPS technique is described in Cai, D., Yu, S., Wen, J., and Ma, W., "VIPS: A Vision-Based Page Segmentation Algorithm," Microsoft Technical Report, MSR-TR-2003-79, 2003, which is hereby incorporated by reference. A VIPS technique uses page layout features (e.g., font, color, and size) to construct a "vision tree" for a web page. The technique identifies nodes from the HTML tag tree and identifies separators (e.g., horizontal and vertical lines) between the nodes. The technique creates a vision tree that has a vertex, referred to as a block, for each identified node. The hierarchical representation of the blocks can effectively keep related blocks together while separating semantically different blocks. FIG. 1 is a diagram that illustrates an example web page and its corresponding vision tree. The web page 110 includes data records 120 and 130, which correspond to blocks 160 and 170, respectively, of vision tree 150. The vision tree includes leaf blocks 162 and 163 corresponding to image 122 and description 123 and leaf blocks 172, 174, and 175, corresponding to image 132 and descriptions 134 and 135.

In one embodiment, the labeling system performs a joint optimization for record identification and element (or attribute) labeling. The labeling system generates a feature vector for each block. The feature vectors are represented as $X=\{X_0, X_1, \ldots, X_{N-1}\}$ where $X_i$ represents the feature vector for block i. The labeling system represents the labels of the blocks as the vectors $Y=\{Y_0, Y_1, \ldots, Y_{N-1}\}$ where $Y_i$ represents the label for block i. The goal of the labeling system is to calculate the maximum posterior probability of Y and extract data from the assignment as represented by the following:

$$y^* = \arg\max p(y|x)$$

where y* represents the labeling with the highest probability for the block represented by the feature vector x. The labeling system thus provides a uniform framework for record identification and attribute labeling. As a result, records that are wrongly identified and cause attribute labeling to perform badly will have a low probability and thus not be selected as the correct labeling. Furthermore, since record identification and attribute labeling are conducted simultaneously, the labeling system can leverage the attribute labels for a better record identification.

In one embodiment, the labeling system uses a hierarchical conditional random fields ("CRF") technique to label the records and elements of the vision tree representing a web page. CRFs are Markov random fields globally conditioned on the observations X. The graph $G=(V,E)$ is an undirected graph of CRFs. According to CRFs, the conditional distribution of the labels y given the observations x has the form represented by the following:

$$p(y|x) = \frac{1}{Z(x)} \prod_{c \in C} \varphi_c(c, y|_c, x) \tag{1}$$

where C represents a set of cliques in graph G, $y|_c$ represents the components of y associated with clique c, $\varphi_c$, represents a potential function defined on $y|_c$, and Z is a normalization factor.

Figure 2:
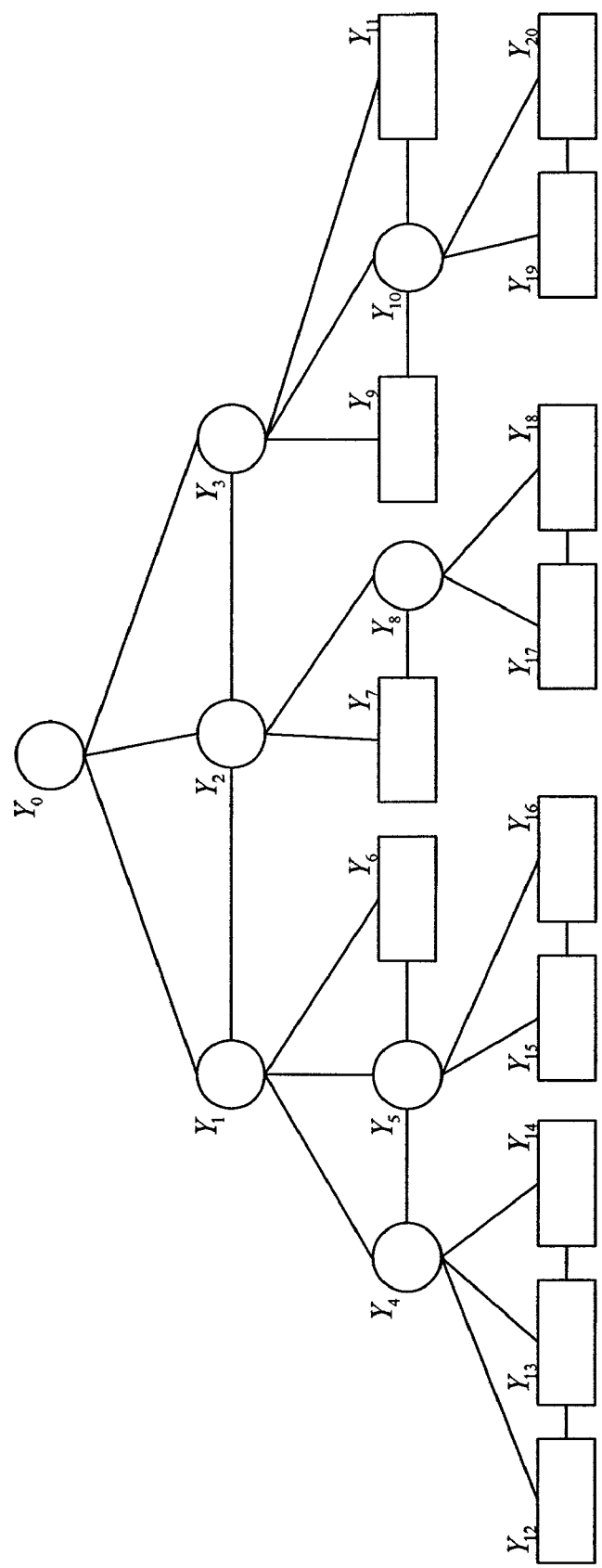
FIG. 2 is a diagram that illustrates the graphical structure of the hierarchical conditional random fields of a vision tree.

FIG. 2 is a diagram that illustrates the graphical structure of the hierarchical conditional random fields of a vision tree. The circles represent inner blocks and the rectangles represent leaf blocks. The observations that are globally conditioned are not shown. The labeling system assumes that every inner block contains at least two child blocks. If an inner block does not contain two child blocks, the labeling system replaces the parent block with the child block. The cliques of the graph in FIG. 2 are its vertices, edges, and triangles. The labeling system represents the conditional probability of Equation 1 as follows:

$$p(y|x) = \frac{1}{Z(x)} \exp \left( \begin{array}{l} \sum_{v,k} \mu_k g_k(v, y|_v, x) + \\ \sum_{e,k} \lambda_k f_k(e, y|_e, x) + \\ \sum_{t,k} \gamma_k h_k(t, y|_t, x) \end{array} \right) \tag{2}$$

where $g_k$, $f_k$, and $h_k$ represent feature functions defined on three types of cliques (i.e., vertex, edge, and triangle, respectively); $\mu_k$, $\lambda_k$, and $\gamma_k$ represent the corresponding weights; $v \in V$; $e \in E$; and t is a triangle, which is also a maximum clique. Although the feature functions generate real values, the labeling system may be implemented so that they are Boolean, that is, true if the feature matches and false otherwise. An example feature function is represented by the following:

$$g_k(y_i, x) = \begin{cases} \text{true,} & \text{if } y_i = \text{Name and } x \text{ is capitalized} \\ \text{false,} & \text{otherwise} \end{cases} \quad (3)$$

which means that if the content of vertex x is capitalized, then the function returns a value of true when the label $y_i$ is "Name."

The labeling system determines weights for the feature functions using the training data $D=\{(y^t,x^t)\}_{i=1}^N$ with the empirical distribution $\tilde{p}(x,y)$ where N is the number of sets of labeled observations in the training data. The labeling system represents the log-likelihood of $\tilde{p}(x,y)$ with respect to a conditional model $p(y|x,\Theta)$ according to the following:

$$L(\Theta) = \prod_{x,y} \tilde{p}(x, y) \log p(y|x, \Theta) \quad (4)$$

where $\Theta=\{\mu_1, \mu_2, \ldots; \lambda_1, \lambda_2, \ldots; \gamma_1, \gamma_2, \ldots\}$ represents the set of weights for the feature functions. The labeling system identifies the weights as the values that optimize the concave log-likelihood function. The labeling system may use various techniques to determine the weights. For example, the labeling system can use techniques used in other maximum-entropy models as described in Lafferty, J., McCallum, A., & Pereira, F., "Conditional Random Fields: Probabilistic Models for Segmenting and Labeling Sequence Data," in Proc. ICML, 2001. The labeling system may also use a gradient-based L-BFGS as described in Liu, D. C., & Nocedal, J., "On The Limited Memory BFGS Method for Large Scale Optimization," Mathematical Programming 45, pp. 503-528, 1989. The gradient-based model represents each element of the gradient vector as follows:

$$\frac{\partial L(\Theta)}{\partial \lambda_k} = E_{p(x,y)}[f_k] - E_{p(y|x,\Theta)}[f_k] \quad (5)$$

where $E_{p(x,y)}[f_k]$ is the expectation with respect to the empirical distribution and $E_{p(y|x,\Theta)}[f_k]$ is the expectation with respect to the conditional model distribution. For example, the expectations of $f_k$ are:

$$E_{p(x,y)}[f_k] = \sum_{x,y} \tilde{p}(x, y) \sum_{e \in E} \sum_{y_i, y_j} f_k(e, y_i, y_j, x) \quad (4)$$

$$E_{p(y|x,\Theta)}[f_k] = \sum_{x} \tilde{p}(x) \sum_{e \in E} \sum_{y_i, y_j} p(y_i, y_j|x) f_k(e, y_i, y_j, x)$$

where $e = (i, j)$ is an edge.

Figure 3:
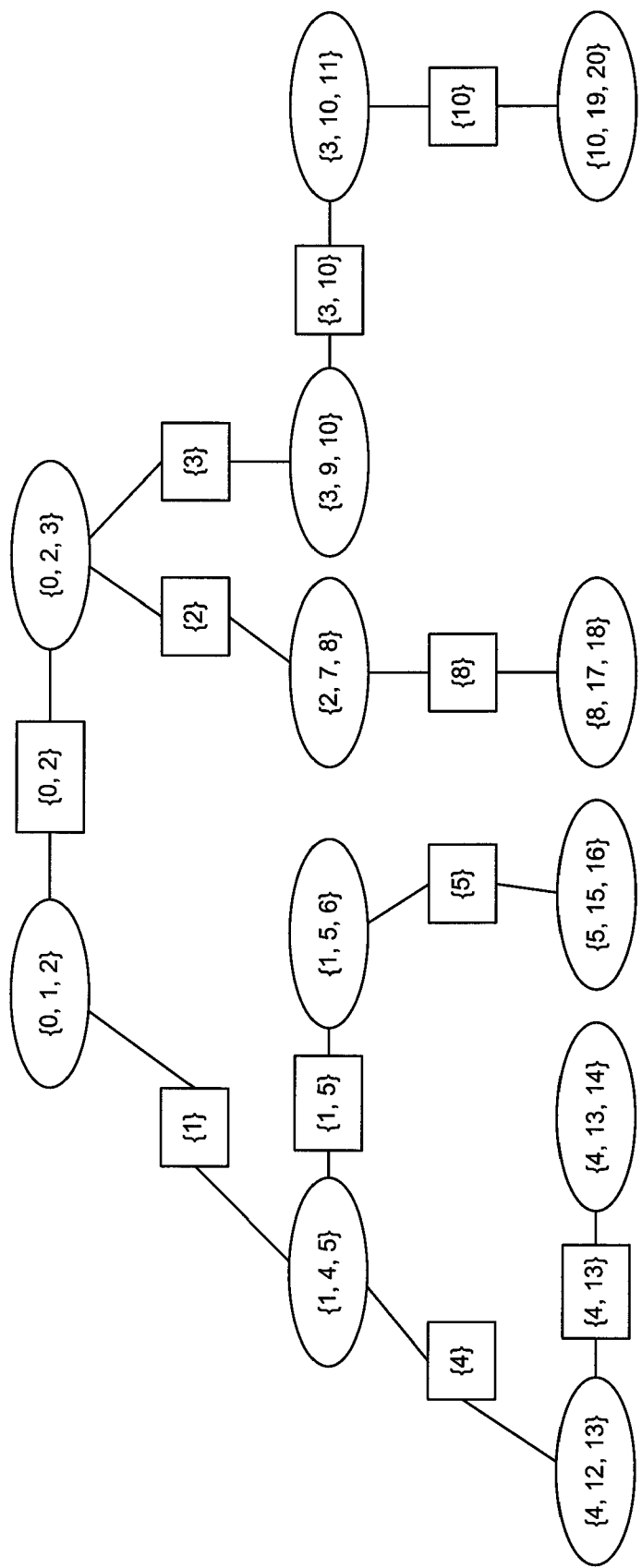
FIG. 3 is a diagram that represents the junction tree corresponding to FIG. 2.

The labeling system calculates the expectation for the empirical distribution once and calculates the marginal probabilities for the model distribution during each iteration while solving the optimization problem of Equation 4. Since the graph of FIG. 2 is a chordal graph, the labeling system performs inference to calculate the marginal probabilities using a junction tree algorithm. A junction tree algorithm is described in Cowell, R., Dawid, A., Lauritzen, S., and Spiegelhalter, D., "Probabilistic Networks and Expert Systems," Springer-Verlag, 1999. A junction tree algorithm constructs the junction tree, initializes potentials of the vertices of the junction tree, and propagates beliefs among the vertices. FIG. 3 represents the junction tree corresponding to FIG. 2. The ellipses represent cliques, and the rectangles represent separators. All the cliques have size 3, since the maximum clique in FIG. 2 is size 3. The labeling system builds the junction tree by obtaining a set of maximal elimination cliques using node elimination. The labeling system then builds a complete cluster graph with weights over cliques. The labeling system selects the spanning tree with the maximum weight as the junction tree.

After the junction tree has been constructed, the labeling system initializes all the potentials of the junction tree to have a value of 1 and multiplies the potential of a vertex, an edge, or a triangle into the potential of any one clique node of T which covers its variables. The potential of a vertex v, an edge e, and a triangle t is represented by the following:

$$\varphi_v(y|_v, x) = \exp(\sum_k \mu_k g_k(v, y|_v, x)), \quad (5)$$

$$\varphi_e(y|_e, x) = \exp(\sum_k \lambda_k f_k(e, y|_e, x)),$$

and $$\varphi_t(y|_t, x) = \exp(\sum_k \gamma_k h_k(t, y|_t, x)).$$

The labeling system in one embodiment uses a two-phase schedule algorithm to propagate beliefs within the junction tree. A two-phase schedule algorithm is described in Jensen, F., Lauritzen, S., and Olesen, K., "Bayesian Updating in Causal Probabilistic Networks by Local Computations," Computational Statistics Quarterly, 4:269-82, 1990. The algorithm uses a collection and distribution phase to calculate the potentials for the cliques and separators. One skilled in the art will appreciate that the labeling system can use other message passing techniques to propagate beliefs. Upon completion of the distribution phase, the potentials represent marginal potentials that are used by the labeling system to guide finding the solution for the weights that best match the training data.

After learning the weights, the labeling system uses the weights to find labels for the blocks of web pages. The labeling system uses the VIPS technique, the junction tree algorithm, and a modified two-phase schedule algorithm to find the best labeling. The labeling system generates a vision tree from the web page and generates a junction tree. The labeling system modifies the two-phase schedule algorithm by replacing its summations with maximizations. The best labeling for a block is found from the potential of any clique that contains the block.

Figure 4:
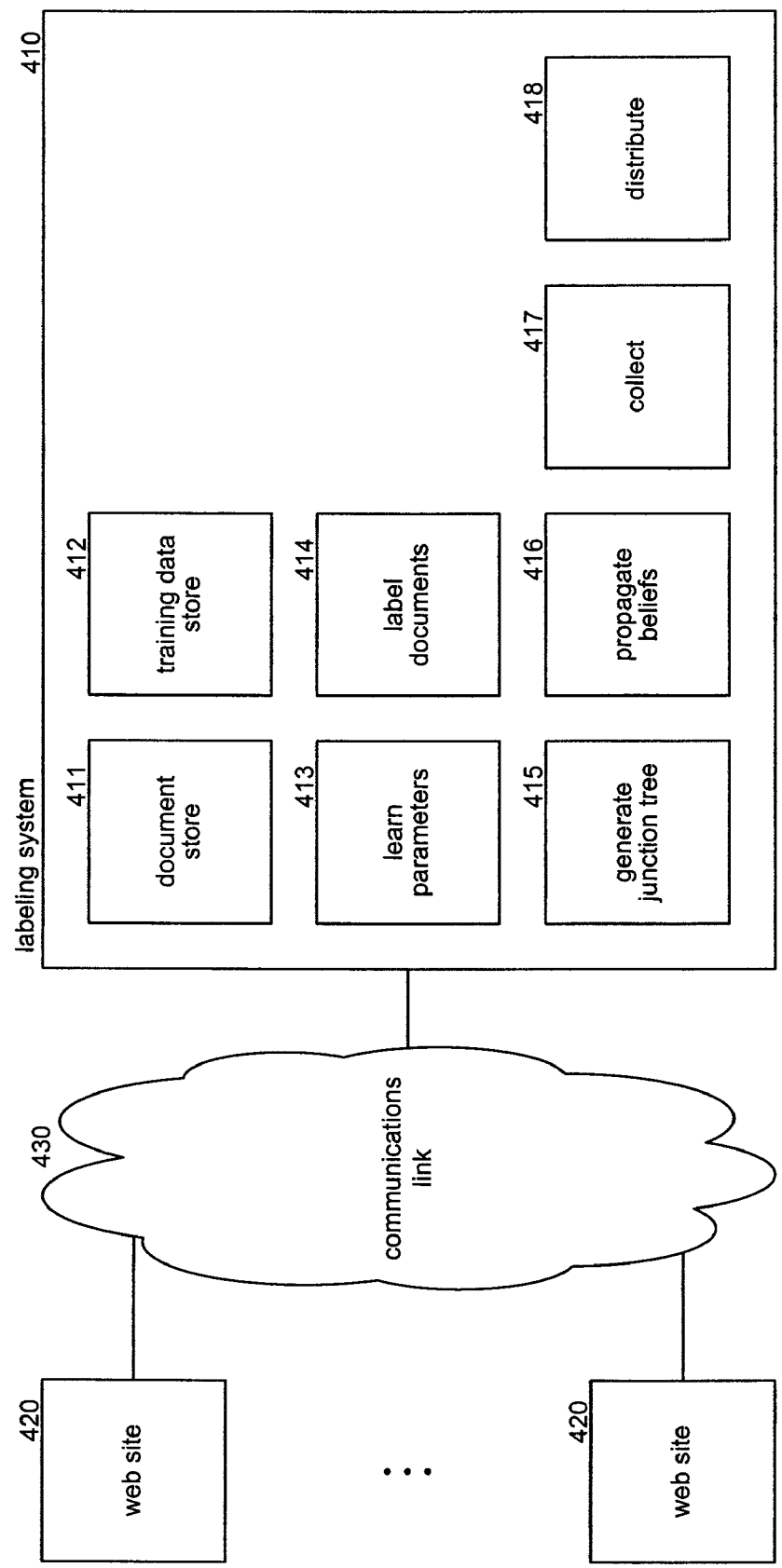
FIG. 4 is a block diagram that illustrates components of the labeling system in one embodiment.

FIG. 4 is a block diagram that illustrates components of the labeling system in one embodiment. The labeling system 410 is connected to web sites 420 via communications link 430. The labeling system includes a document store 411 and a training data store 412. The document store contains web pages that may be collected from the various web sites. The training data store contains vision trees generated from the web pages along with the correct labeling of the records and elements of the web pages. The labeling system also includes a learn parameters component 413 and a label documents component 414. The learn parameters component inputs the training data and generates the weights for the feature functions. The label documents component inputs a web page and identifies the correct labeling for the blocks within the web page. The labeling system also includes auxiliary components such as a generate junction tree component 415, a propagate beliefs component 416, a collect component 417, and a distribute component 418 as described below in detail.

The computing devices on which the labeling system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the labeling system. In addition, the data structures and message structures may be stored or transmitted via a data transmission medium, such as a signal on a communications link. Various communications links may be used, such as the Internet, a local area network, a wide area network, or a point-to-point dial-up connection.

The labeling system may be used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The labeling system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
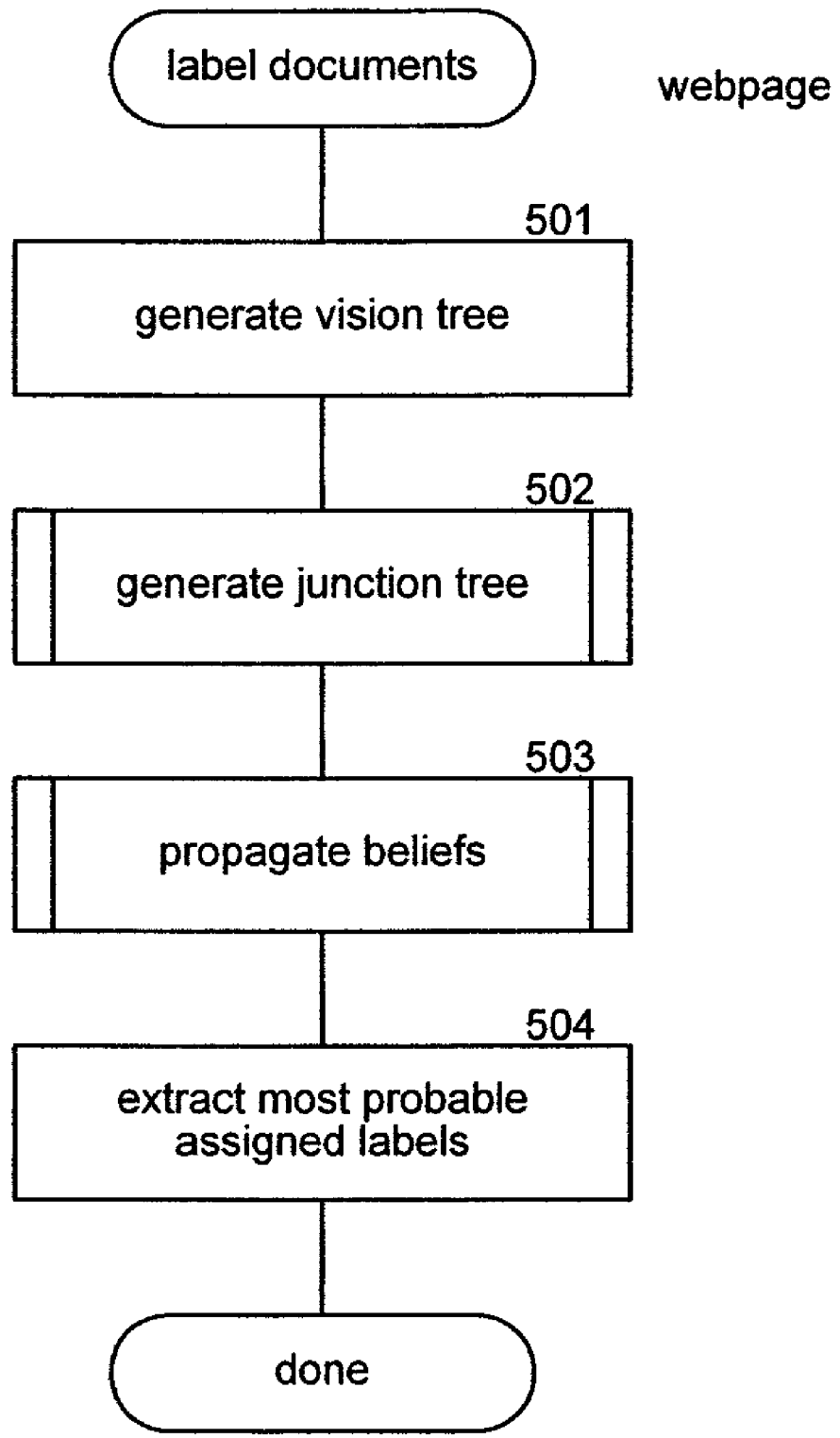
FIG. 5 is a flow diagram that illustrates the processing of the label documents component of the labeling system in one embodiment.

FIG. 5 is a flow diagram that illustrates the processing of the label documents component of the labeling system in one embodiment. The label documents component is passed a web page and returns an assignment of labels for the blocks of the web page. In block 501, the component generates a vision tree for the web page. In block 502, the component invokes the generate junction tree component to generate a junction tree based on the vision tree. In block 503, the component invokes the propagate beliefs component to propagate the beliefs for the assignments of the labels to the vertices of the junction tree. In block 504, the component assigns the labels with the highest probability to the blocks of the web page and then completes.

Figure 6:
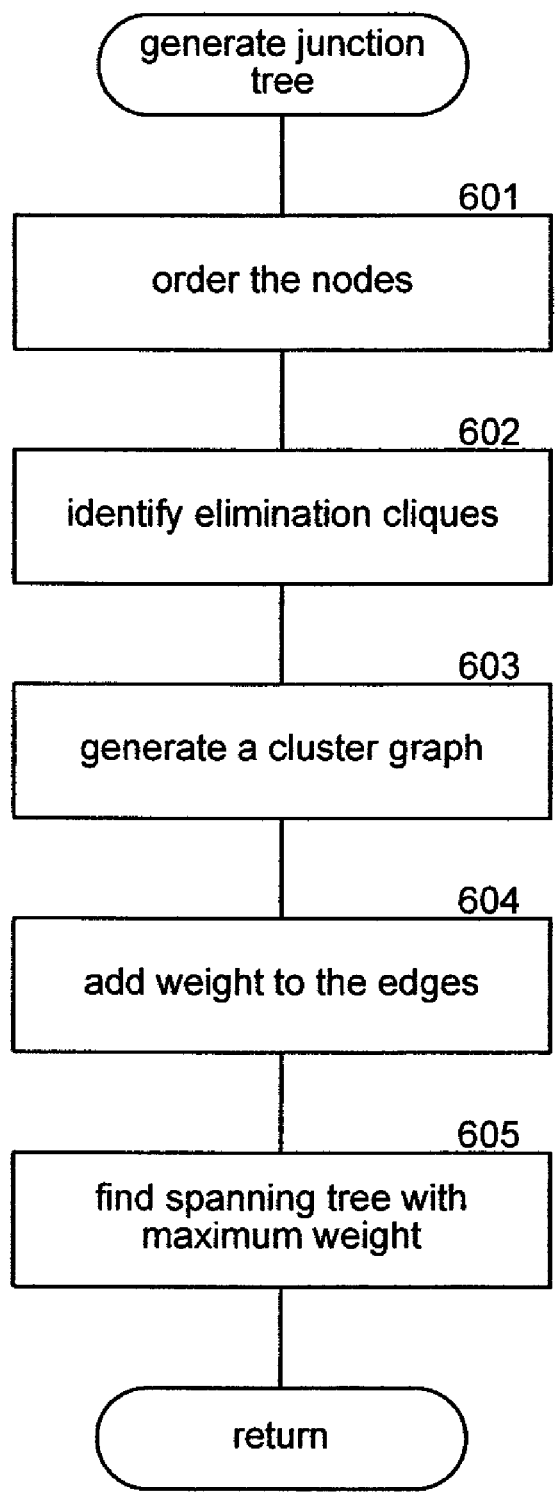
FIG. 6 is a flow diagram that illustrates the processing of the generate junction tree component of the labeling system in one embodiment.

FIG. 6 is a flow diagram that illustrates the processing of the generate junction tree component of the labeling system in one embodiment. The component is passed a vision tree and generates a junction tree as described in Cowell, R., Dawid, A., Lauritzen, S., and Spiegelhalter, D., "Probabilistic Networks and Expert Systems," Springer-Verlag, 1999. In block 601, the component orders the nodes of the vision tree. In block 602, the component identifies the elimination cliques using node elimination. In block 603, the component generates a cluster graph from the elimination cliques. In block 604, the component adds weights to the edges based on the probabilities. In block 605, the component identifies a spanning tree with the maximum weight. The identified spanning tree is the junction tree. The component then returns.

Figure 7:
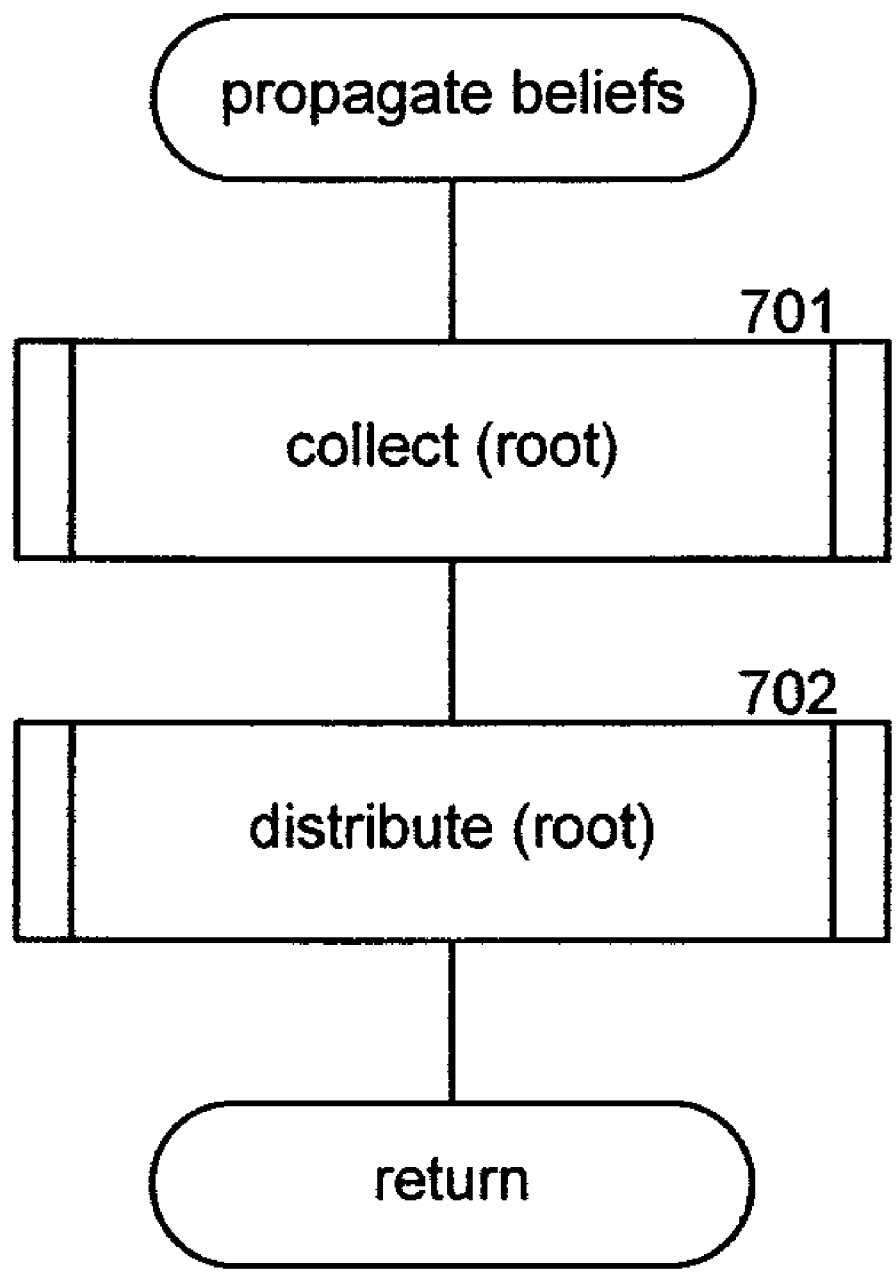
FIG. 7 is a flow diagram that illustrates the processing of the propagate beliefs component of the labeling system in one embodiment.

FIG. 7 is a flow diagram that illustrates the processing of the propagate beliefs component of the labeling system in one embodiment. The component implements the two-phase schedule algorithm by invoking the collect component in block 701 passing the root node of the junction tree and then invoking the distribute component in block 702 passing the root node of the junction tree. The collect component and the distribute component are recursive routines that collect and distribute the potentials of the nodes of the junction tree. The component then returns.

Figure 8:
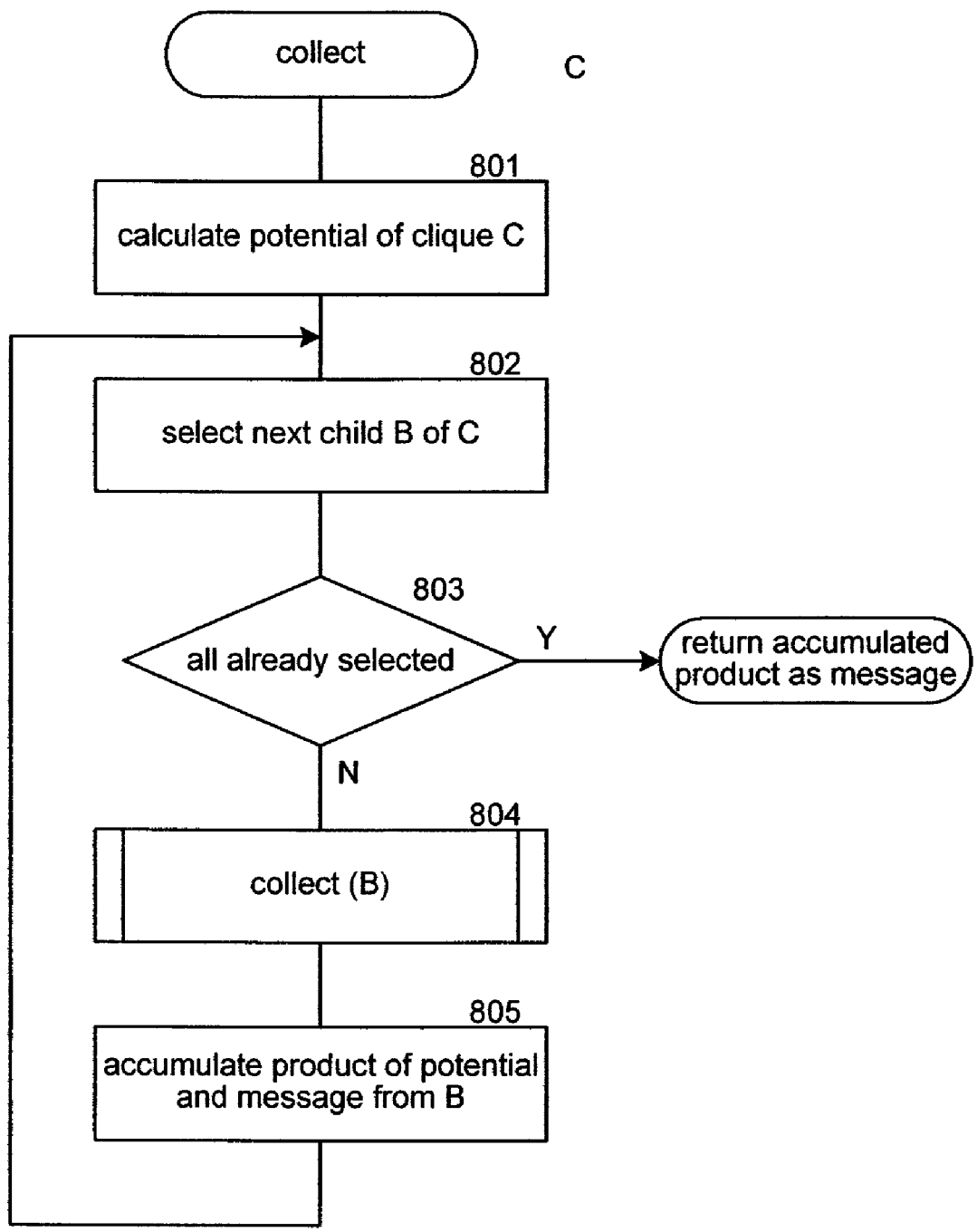
FIG. 8 is a flow diagram that illustrates the processing of the collect component of the labeling system in one embodiment.

FIG. 8 is a flow diagram that illustrates the processing of the collect component of the labeling system in one embodiment. The component recursively invokes itself for each child clique of the passed clique to collect the potentials from the child cliques. In block 801, the component calculates the potential of the passed clique. In blocks 802-805, the component loops selecting each child clique of the passed clique. In block 802, the component selects the next child clique. In decision block 803, if all the child cliques have already been selected, then the component returns the accumulated potential, else the component continues at block 804. In block 804, the component invokes the collect component recursively passing the selected child clique. In block 805, the component accumulates the product of the potential of the passed clique with the potential provided by the selected child clique and then loops to block 802 to select the next child clique.

Figure 9:
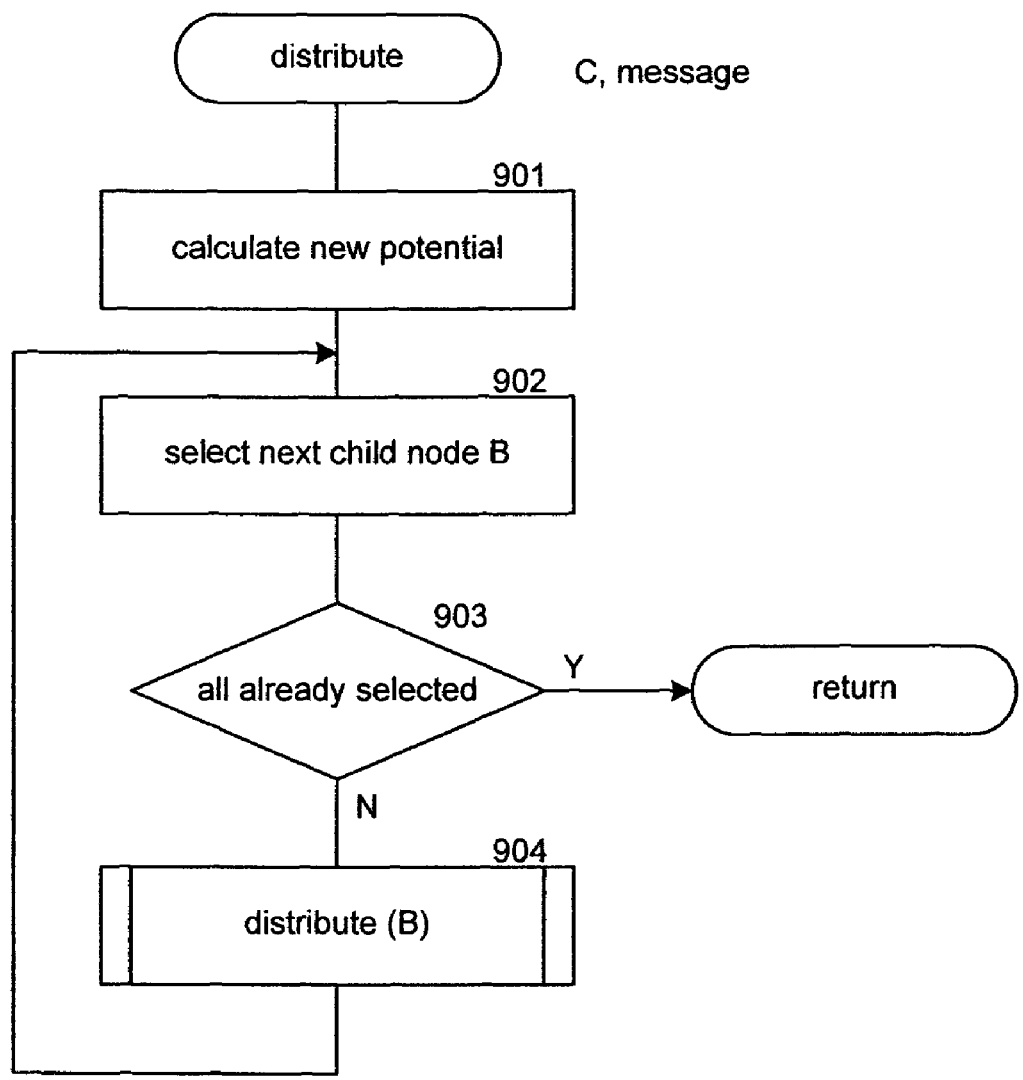
FIG. 9 is a flow diagram that illustrates the processing of the distribute component of the labeling system in one embodiment.

FIG. 9 is a flow diagram that illustrates the processing of the distribute component of the labeling system in one embodiment. The component is passed a clique along with a potential to be distributed to that clique. In block 901, the component calculates a new potential for the clique factoring in the passed potential. In blocks 902-904, the component loops selecting each child clique and recursively invoking itself. In block 902, the component selects the next child clique. In decision block 903, if all the child cliques have already been selected, then the component returns, else the component continues at block 904. In block 904, the component recursively invokes the distribute component passing the child clique and then loops to block 902 to select the next child clique.

Figure 10:
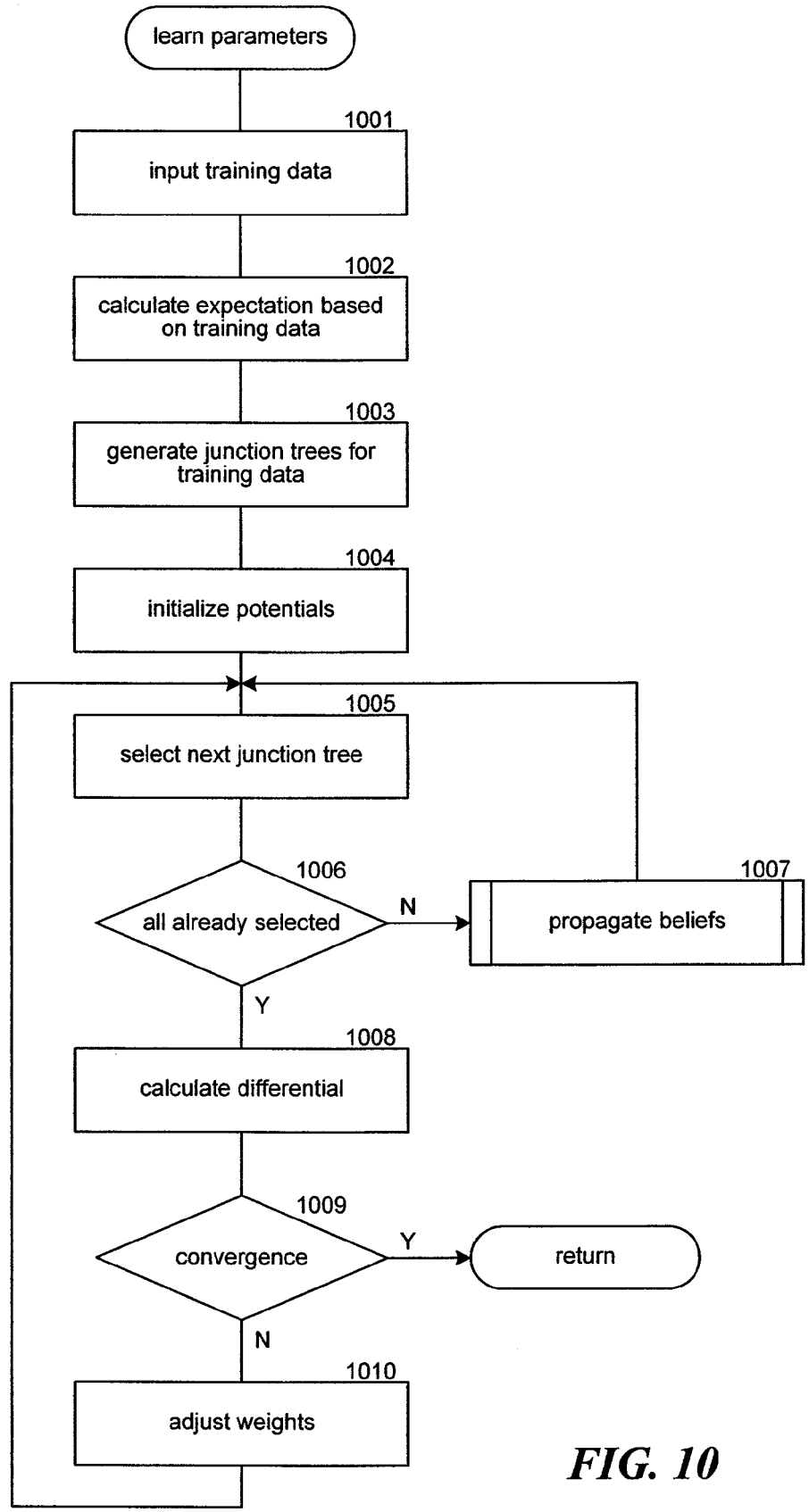
FIG. 10 is a flow diagram that illustrates the processing of the learn parameters component of the labeling system in one embodiment.

FIG. 10 is a flow diagram that illustrates the processing of the learn parameters component of the labeling system in one embodiment. The learn parameters component inputs the training data and learns the weights for the feature functions. In block 1001, the component inputs the training data. In block 1002, the component calculates the expectations based on the training data. In block 1003, the component generates a junction tree for each web page of the training data by invoking the generate junction tree component for each web page. In block 1004, the component initializes potentials of the junction trees. In blocks 1005-1010, the component loops selecting new weights until the weights converge on a solution. In block 1005, the component selects the next junction tree. In decision block 1006, if all the junction trees have already been selected, then the component continues at block 1008, else the component continues at block 1007. In block 1007, the component invokes the propagate beliefs component to propagate the beliefs for the selected junction tree and then loops to block 1005 to select the next junction tree. In block 1008, the component calculates a differential between the expectation based on the propagated beliefs and the expectation based on the training data. In decision block 1009, if the differential approaches zero, then the component returns with a solution, else the component continues at block 1010. In block 1010, the component adjusts the weights of the feature functions in the direction of the minimum gradient descent and then loops to block 1005 to propagate beliefs of the junction tree with the new weights.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. In particular, the two-dimensional CRF technique may be used to label any type of observations that have a two-dimensional relationship. Accordingly, the invention is not limited except as by the appended claims.

We claim:

1. A method performed by a computing device with a processor and memory for labeling observations, the method comprising:

receiving observations having hierarchical relationships represented by a graph having vertices representing observations and edges representing relationships, a collection of related vertices being a clique, a clique being a subset of vertices of the graph in which each pair of distinct vertices in the subset is joined by an edge;

storing the received observations in the memory determining by the computing device a labeling for the observations using a conditional random fields technique that factors in the hierarchical relationships, a conditional probability p of label y given observation x of the conditional random fields technique being represented as follows:

$$p(y|x) = \frac{1}{Z(x)} \exp\left( \sum_{v,k} \mu_k g_k(v, y|_v, x) + \sum_{e,k} \lambda_k f_k(e, y|_e, x) + \sum_{t,k} \gamma_k h_k(t, y|_t, x) \right)$$

where v represents a vertex clique, e represents an edge clique, and t represents a triangle clique, $y|_v$, $y|_e$, and $y|_t$ represent components of label y, Z is a normalization factor, $g_k$, $f_k$, and $h_k$ represent feature functions, and $\mu_k$, $\lambda_k$, and $\gamma_k$ represent weights of the feature functions; and storing by the computing device the labeling for the observations.

2. The method of claim 1 wherein the observations are represented as a tree of observation vertices and the determining includes identifying a hierarchy of cliques of observation vertices within the tree and calculating a probability for sets of labels based on probabilities derived from features of components of the cliques that contain the observation vertices.

3. The method of claim 2 wherein the components of a clique include the edges and vertices of the clique.

4. The method of claim 2 wherein the calculating of the probability for a set of labels includes generating a junction tree of the cliques and propagating a belief to the cliques of the junction tree.

5. The method of claim 4 wherein the beliefs are propagated using a collection phase and a distribution phase.

6. The method of claim 1 including deriving weights for feature functions based on training data and wherein the determining includes calculating a probability for a set of labels based on the training data.

7. The method of claim 6 wherein the deriving includes optimizing a log-likelihood function based on the training data.

8. The method of claim 6 wherein the optimizing uses a gradient-based L-BFGS technique.

9. The method of claim 1 wherein the determining of the labeling includes propagating probability-related calculations from observation to observation.

10. A computer-readable storage medium containing instructions for controlling a computer system to identify object records and object elements of a web page, by a method comprising:

providing a hierarchical representation of blocks of the web page, each block representing an object record or an object element, the blocks represented by observations having hierarchical relationships represented by a graph having vertices representing observations and edges representing relationships, a collection of related vertices being a clique, a clique being a subset of vertices of the graph in which each pair of distinct vertices in the subset is joined by an edge; and applying a hierarchical conditional random fields technique to jointly identify a set of record labels and element labels for the blocks based on the hierarchical relationship of the blocks of the web page, the applying including identifying the labels uses a conditional random fields technique that factors in the hierarchical relationships, a conditional probability p of label y given observation x of the conditional random fields technique being represented as follows:

$$p(y|x) = \frac{1}{Z(x)} \exp\left( \sum_{v,k} \mu_k g_k(v, y|_v, x) + \sum_{e,k} \lambda_k f_k(e, y|_e, x) + \sum_{t,k} \gamma_k h_k(t, y|_t, x) \right)$$

where v represents a vertex clique, e represents an edge clique, and t represents a triangle clique, $y|_v$, $y|_e$, and $y|_t$ represent components of label y, Z is a normalization factor, $g_k$, $f_k$, and $h_k$ represent feature functions, and $\mu_k$, $\lambda_k$, and $\gamma_k$ represent weights of the feature functions.

11. The computer-readable storage medium of claim 10 wherein the blocks are represented as a tree of blocks and the applying of a hierarchical conditional random fields technique includes identifying a hierarchy of cliques of blocks within the tree and calculating a probability for sets of labels based on probabilities derived from features of components of the cliques that contain the blocks.

12. The computer-readable storage medium of claim 10 including deriving weights for feature functions based on training data of object records, object elements, and labels and wherein the applying calculates a probability for a set of labels based on the derived weights.

13. The computer-readable storage medium of claim 12 wherein the applying uses a gradient-based L-BFGS technique.

* * * * *